United States Patent [19]
Matsumoto et al.

[11] Patent Number: 5,274,063
[45] Date of Patent: Dec. 28, 1993

[54] VINYL POLYMER HAVING (METH)ACRYLOYL GROUPS ON THE SIDE CHAINS AND METHOD FOR PREPARING SAME

[75] Inventors: Akira Matsumoto, Takarazuka; Jun-ichi Ikeda, Osaka; Hajime Yoneno, Ikoma, all of Japan

[73] Assignee: Kyoeisha Chemical Co., Ltd., Japan

[21] Appl. No.: 808,585

[22] Filed: Dec. 17, 1991

[30] Foreign Application Priority Data

Dec. 26, 1990 [JP] Japan ................... 2-406612
Dec. 26, 1990 [JP] Japan ................... 2-406613
Jun. 20, 1991 [JP] Japan ................... 3-148661
Jun. 20, 1991 [JP] Japan ................... 3-148662

[51] Int. Cl.$^5$ .............. C08F 220/26; C08F 220/10; C08F 222/10
[52] U.S. Cl. ................... 526/320; 526/328.5; 526/325
[58] Field of Search ................... 526/320, 325

[56] References Cited
FOREIGN PATENT DOCUMENTS 250020 12/1985 Japan .
61-231081 10/1986 Japan .

OTHER PUBLICATIONS

Chemical Abstracts, vol. 104, No. 22, Jun. 2, 1986, Columbus, Ohio, US; Abstract No. 187076, "Nonaqueous Resin Dispersions", p. 15, column 2.

*Primary Examiner*—Joseph L. Schofer
*Assistant Examiner*—Wu C. Cheng
*Attorney, Agent, or Firm*—Parkhurst, Wendel & Rossi

[57] ABSTRACT

The present invention relates to a reactive vinyl polymer having (meth)acryloyl groups on the side chains obtained by radical-copolymerizing a monofunctional (meth)acrylate with a polyfunctional (meth)acrylate under specific conditions in a solvent as well as a method for preparing the same. In order to prevent the occurrence of gelation during the copolymerization, a long chain alkyl group or the like is introduced into the monofunctional (meth)acrylate to control a crosslinking reaction while making use of the steric effect of the long chain alkyl group or the like. The vinyl polymer of the present invention is effective for use as a photo hardenable and thermo setting gluing agent or adhesive and a resin for gluing agents and adhesives, further it serves as a functional polymeric material and thus can be incorporated into other resins.

6 Claims, No Drawings

VINYL POLYMER HAVING (METH)ACRYLOYL GROUPS ON THE SIDE CHAINS AND METHOD FOR PREPARING SAME

BACKGROUND OF THE INVENTION

The present invention relates to a vinyl polymer having (meth)acryloyl groups on the side chains which can be used as a material for making a variety of polymeric materials highly multi-functional and highly efficient as well as a method for preparing the same.

There have been used a variety of polymeric materials in a wide variety of fields along with the recent marked progress in polymer industries. In particular, there have been conducted the development of more excellent materials over recent several years in order to satisfy the recent requirements for the improvement in quality, performance and functionality of industrial products.

Under such circumstances, (meth)acrylic monomers have widely been used in the fields of, for instance, paints, gluing agents, adhesives, inks, fiber-processing agents and synthetic resin plates because of their high reactivity, kinds of new (meth)acrylic monomers have likewise recently been increased year by year in proportion to the industrial importance thereof and the molecular weight of these monomers has also been increased along with the diversity in applications thereof. For instance, there have been known a series of polymers having a relatively low molecular weight of the order of about 1000 to several tens of thousands and a (meth)acryloyl group at one end thereof (called "macromer" or macromonomer"). They can easily provide a variety of graft polymers if they are copolymerized with vinyl monomers. For this reason, these graft polymers have been investigated and applied to the fields which require any particular combination of physical properties and functions such as a microphase separation structure, amphiphatic properties and interfacial activity, i.e., in the fields of adhesives, gluing agents, compatibilizing agents and medical materials.

On the other hand, it can be considered that reactive oligomers or polymers having a plurality of (meth)acryloyl groups in the molecular chains per se are used as photohardenable or thermosetting resins or that it is easy for imparting new functions or processability to these oligomers or polymers if they are simultaneously used with other resins and thus they would be anticipated as functional polymeric materials used in a variety of industrial applications.

The inventors of this invention have worked on the development of reactive oligomers or polymers of a new type having (meth)acryloyl groups in the molecule. As a result, the inventors have found out that reactive vinyl polymers having (meth)acryloyl groups on the side chains can easily be obtained by radical-copolymerizing certain kinds of monofunctional (meth)acrylates with polyfunctional (meth)acrylates under specific conditions in a solvent and thus have completed the present invention.

SUMMARY OF THE INVENTION

The present invention has broken conventional common knowledge that the radical copolymerization of a monofunctional (meth)acrylate with a polyfunctional (meth)acrylate easily leads to gelation. More specifically, according to the present invention, the crosslinking reaction between growing polymer radicals and (meth)acryloyl groups on the side chains of prepolymers can principally be controlled by introducing a group selected from the group consisting of long chain alkyl groups having 6 to 22 carbon atoms, cyclic alkyl groups having 6 to 22 carbon atoms and groups represented by the formula: $-(C_xH_{2x}O)_l-(C_yH_{2y}O)_m-R_3$ into the substituent of the side chain on the (meth)acrylate monomer to make use of the steric effect of the introduced group.

According to an aspect of the present invention (first invention), there is provided a vinyl polymer having (meth)acryloyl groups on the side chains, which comprises repeating units represented by the following general formula (1) wherein the rate of subunit p ranges form 40 to 99.5 mole % and the rate of subunit q ranges from 60 to 0.5 mole % and which has a weight average molecular weight ranging from $2\times10^3$ to $10^7$ g:

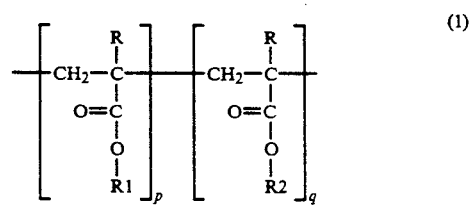

In the foregoing general formula (1), R represents a hydrogen atom or a methyl group; R1 represents a long chain alkyl group having 6 to 22 carbon atoms, a cyclic alkyl group having 6 to 22 carbon atoms or a group represented by the formula: $-(C_xH_{2x}O)_l-(C_yH_{2y}O)_m-R_3$ (wherein R3 represents a hydrogen atom, an alkyl group or an aryl group); x and y each represents an integer ranging from 1 to 4; l and m each represents 0 or an integer of not less than 1, provided that the sum of l and m is an integer of not less than 2; and R2 represents a (meth)acryloyl group-containing group.

In the foregoing general formula (1), R2 may be a (meth)acryloyl group-containing group represented by the following general formula (2):

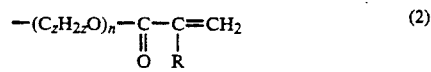

wherein R represents a hydrogen atom or a methyl group; z represents an integer ranging from 2 to 10; and n is an integer ranging from 1 to 4 when z is an integer ranging from 2 to 3, n is 1 or 2 when z is 4 or n is 1 when z is an integer ranging from 5 to 10. The substituent R2 in the general formula (1) may also be a (meth)acryloyl group-containing group represented by the following general formula (3):

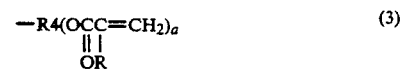

wherein R represents a hydrogen atom or a methyl group; R4 represents an ester residue of a polyhydric alcohol having 1 to 12 carbon atoms; and a represents an integer ranging from 1 to 10.

The vinyl polymer having (meth)acryloyl groups on the side chains represented by the general formula (1) according to the first aspect of the present invention can be prepared by radical-copolymerizing 40 to 99.5 mole % of at least one mono(meth)acrylate monomer represented by the following general formula (5):

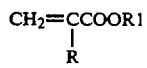

(wherein R represents a hydrogen atom or a methyl group; R1 represents a long chain alkyl group having 6 to 22 carbon atoms, a cyclic alkyl group having 6 to 22 carbon atoms or a group represented by the formula: $-(C_xH_{2x}O)_l-(C_yH_{2y}O)_m-R3$ (wherein R3 represents a hydrogen atom, an alkyl group or an aryl group); x and y each represents an integer ranging from 1 to 4; and l and m each represents 0 or an integer of not less than 1, provided that the sum of l and m is an integer of not less than 2) which has a single (meth)acryloyl group and a molecular weight of not less than 160 g with 60 to 0.5 mole % of at least one (meth)acrylate monomer represented by the following general formula (6):

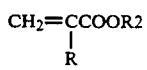

(wherein R represents a hydrogen atom or a methyl group; and R2 represents a (meth)acryloyl group-containing group) which has a plurality of (meth)acryloyl groups and a molecular weight of not more than 700 g, in a good solvent for the mono(meth)acrylate monomer, wherein the total concentration of the monomers in the reaction system is limited to a level of not more than 2 mole/l.

The monomer represented by the general formula (6) is at least one member selected from the group consisting of di(meth)acrylate monomers of the general formula (6) in which the substituent R2 is represented by the general formula (2):

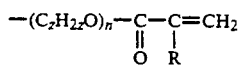

wherein R represents a hydrogen atom or a methyl group; z represents an integer ranging from 2 to 10; and n is an integer ranging from 1 to 4 when z is an integer ranging from 2 to 3, n is 1 or 2 when z is 4 or n is 1 when z is an integer ranging from 5 to 10; and poly(meth)acrylate monomers of the general formula (6) in which the substituent R2 is represented by the following general formula (3);

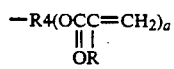

wherein R represents a hydrogen atom or a methyl group; R4 represents an ester residue of a polyhydric alcohol having 1 to 12 carbon atoms; and a represents an integer ranging form 1 to 10.

According to a second aspect of the present invention (second invention), there is provided a vinyl polymer carrying (meth)acryloyl groups on the side chains, which comprises repeating units represented by the following general formula (4) wherein p ranges form 40 to 99.5 mole %, q ranges form 60 to 0.5 mole % and r ranges form 0 to 59.5 mole % and which has a weight average molecular weight ranging from $2 \times 10^3$ to $10^7$:

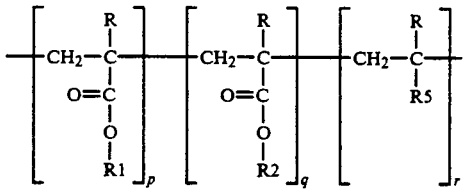

In the foregoing general formula (4), R represents a hydrogen atom or a methyl group; R1 represents a long chain alkyl group having 6 to 22 carbon atoms, a cyclic alkyl group having 6 to 22 carbon atoms or a group represented by the formula: $-(C_xH_{2x}O)_1-(C_yH_{2y}O)_m-R3$ (wherein R3 represents a hydrogen atom, an alkyl group or an aryl group); x and y each represents an integer ranging from 1 to 4; l and m each represents 0 or an integer of not less than 1, provided that the sum of l and m is an integer of not less than 2; R2 represents a (meth)acryloyl groupcontaining group; and R5 represents a functional group having a molecular weight of less than 133 g.

In the foregoing general formula (4), the substituent R2 may be a (meth)acryloyl group-containing group represented by the following general formula (2);

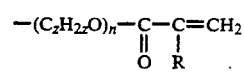

wherein R represents a hydrogen atom or a methyl group; z represents an integer ranging from 2 to 10; and n is an integer ranging from 1 to 4 when z is an integer ranging from 2 to 3, n is 1 or 2 when z is 4 or n is 1 when z is an integer ranging from 5 to 10. The substituent R2 in the general formula (4) may also be a (meth)acryloyl group-containing group represented by the following general formula (3);

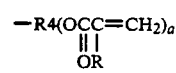

wherein R represents a hydrogen atom or a methyl group; R4 represents an ester residue of a polyhydric alcohol having 1 to 12 carbon atoms; and a represents an integer ranging from 1 to 10.

The vinyl polymer having (meth)acryloyl groups on the side chains represented by the general formula (4) according to the second invention can be prepared by radical-copolymerizing 40 to 99.5 mole % of at least one mono(meth)acrylate monomer represented by the following general formula (5):

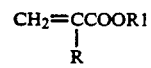

(wherein R represents a hydrogen atom or a methyl group; R1 represents a long chain alkyl group having 6 to 22 carbon atoms, a cyclic alkyl group having 6 to 22 carbon atoms or a group represented by the formula: $-(C_xH_{2x}O)_1-(C_yH_{2y}O)_m-R3$ (wherein R3 represents a hydrogen atom, an alkyl group or an aryl group); x and y each represents an integer ranging from 1 to 4; and l and m each represents 0 or an integer of not less than 1, provided that the sum of l and m is an integer of not less than 2) which has a single (meth)acryloyl group and a molecular weight of not less than 160 g; 60 to 0.5 mole % of at least one (meth)acrylate monomer represented by the following general formula (6):

(wherein R represents a hydrogen atom or a methyl group; and R2 represents a (meth)acryloyl group-containing group) which has a plurality of (meth)acryloyl groups and a molecular weight of not more than 700 g; and 0 to 59.5 mole % of at least one vinyl compound or vinylidene compound represented by the following general formula (7):

wherein R represents a hydrogen atom or a methyl group; and R5 represents a functional group having a molecular weight of less than 133 g) which has a molecular weight of not more than 160 g, in a good solvent for the mono (meth)acrylate monomer, wherein the total concentration of the monomers in the reaction system is limited to a level of not more than 2 mole/l.

The monomer represented by the general formula (6) is at least one member selected from the group consisting of di(meth)acrylate monomers of the general formula (6) in which the substituent R2 is represented by the general formula (2):

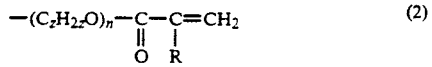

wherein R represents a hydrogen atom or a methyl group; z represents an integer ranging from 2 to 10; and n is an integer ranging from 1 to 4 when z is an integer ranging from 2 to 3, n is 1 or 2 when z is 4 or n is 1 when z is an integer ranging from 5 to 10; and poly(meth)acrylate monomers of the general formula (6) in which the substituent R2 is represented by the following general formula (3):

wherein R represents a hydrogen atom or a methyl group; R4 represents an ester residue of a polyhydric alcohol having 1 to 12 carbon atoms; and a represents an integer ranging from 1 to 10.

The vinyl polymer according to the present invention comprises (meth)acryloyl groups on the side chains and is useful as photohardenable and thermosetting gluing agents or adhesives as well as a resin for gluing agents and adhesives because of the high reactivity of (meth)acryloyl groups on the side chain. Moreover, the vinyl polymer of the present invention is likewise useful as a functional polymeric material by mixing with other resins. The method for preparing the vinyl polymer carrying (meth)acryloyl groups on the side chains according to the present invention comprises simple reaction operations unlike the conventional methods which comprise complicated multistage reaction processes.

DETAILED EXPLANATION OF THE INVENTION

The first invention relates to a vinyl polymer having (meth)acryloyl groups on the side chains whose repeating units are represented by the foregoing general formula (1). The repeating unit represented by the general formula (1) can be formed by polymerizing corresponding monomers, i.e., the monomers represented by the general formulae (5) and (6) respectively:

In the foregoing general formulae (5) and (6), R represents a hydrogen atom or a methyl group; R1 represents a long chain alkyl group having 6 to 22 carbon atoms, a cyclic alkyl group having 6 to 22 carbon atoms or a group represented by the formula: —$(C_xH_{2x}O)_l$—$(C_yH_{2y}O)_m$—R3 (wherein R3 represents a hydrogen atom, an alkyl group or an aryl group); x and y each represents an integer ranging from 1 to 4; l and m each represents 0 or an integer of not less than 1, provided that the sum of l and m is an integer of not less than 2; and R2 represents a (meth)acryloyl group-containing group.

In the foregoing general formula (6), the substituent R2 may be a (meth)acryloyl group-containing group represented by the following general formula (2):

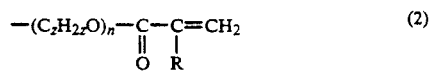

wherein R represents a hydrogen atom or a methyl group; z represents an integer ranging from 2 to 10; and n is an integer ranging from 1 to 4 when z is an integer ranging from 2 to 3, n is 1 or 2 when z is 4 or n is 1 when z is an integer ranging from 5 to 10.

The substituent R2 in the general formula (6) may also be a (meth)acryloyl group-containing group represented by the following general formula (3):

wherein R represents a hydrogen atom or a methyl group; R4 represents an ester residue of a polyhydric alcohol having 1 to 12 carbon atoms; and a represents an integer ranging from 1 to 10.

Specific examples of the monomers represented by the general formula (5) include hexyl (meth)acrylate, heptyl (meth)acrylate, octyl (meth)acrylate, nonyl (meth) acrylate, decyl (meth)acrylate, undecyl (meth)acrylate, dodecyl (meth)acrylate, tridecyl (meth)acrylate, tetradecyl (meth)acrylate, hexadecyl (meth)acrylate, heptadecyl (meth)acrylate, octadecyl (meth)acrylate, nonadecyl (meth)acrylate, eicosa (meth)acrylate, uneicosa (meth)acrylate, doeicosa (meth)acrylate and isomers thereof such as 2-ethylhexyl (meth)acrylate and isononyl (meth)acrylate for those in which R1 is a long chain alkyl group having 6 to 22 carbon atoms; isobornyl (meth)acrylate, tricyclodecanyl (meth)acrylate and dimethyladamantyl (meth)acrylate for those in which R1 is a cyclic alkyl group having 6 to 22 carbon atoms; and methoxydiethylene glycol (meth)acrylate, ethoxydiethylene glycol (meth)acrylate, isoctyloxydiethylene glycol (meth)acrylate, phenoxydiethylene glycol (meth)acrylate, phenoxytriethylene glycol (meth)acrylate, methoxytriethylene glycol (meth)acrylate, methoxypolyethylene glycol (meth)acrylate, nonylphenyltetraethylene glycol (meth)acrylate, nonylphenyloctadecylethylene glycol (meth)acrylate, methoxydipropylene glycol (meth)acrylate, (meth)acrylate of 11:15 by molar ratio random adduct of ethylene oxide-propylene oxide one end of which is modified with a stearyloxy group and polytetramethylene glycol mono(meth)acrylate as well as isomers thereof for those in which R1 is a group represented by the formula: $-(C_xH_{2x}O)_l-(C_yH_{2y}O)_m-R3$.

These monomers represented by the general formula (5) may be used alone or in any combination of at least two of them.

The monomers represented by the general formula (6) include those in which R2 is represented by the general formula (2) and those having R2 represented by the general formula (3). These monomers represented by the general formula (6) sometimes undergo intramolecular cyclization and crosslinking reactions during polymerization, but these reactions does not cause any trouble.

Specific examples of the monomers represented by the general formula (6) include ethylene glycol di(meth)acrylate, diethylene glycol di(meth)acrylate, triethylene glycol di(meth)acrylate, tetraethylene glycol di(meth)acrylate, propylene glycol di(meth)acrylate, tetrapropylene glycol di(meth)acrylate, 1,4-butanediol di(meth)acrylate, di(tetramethylene glycol) di(meth)acrylate, 1,5-pentanediol di(meth)acrylate, 1,6-hexanediol di(meth)acrylate, 3-methyl-1,5-pentanediol di(meth) acrylate, 1,9-nonanediol di(meth)acrylate, 1,10-decanediol di(meth)acrylate and isomers thereof for those in which R2 is represented by the general formula (2); and trimethylolpropane tri(meth)acrylate, pentaerythritol tri(meth)acrylate, pentaerythritol tetra (meth)acrylate, dipentaerythritol hexa(meth)acrylate, trimethylolheptane tri(meth)acrylate and isomers thereof for those in which R2 is represented by the general formula (3).

These monomers represented by the general formula (6) may be used alone or in any combination of at least two of them.

The second invention relates to a vinyl polymer having (meth)acryloyl groups on the side chains whose repeating units are represented by the foregoing general formula (4). The repeating unit represented by the general formula (4) can be obtained by copolymerizing the foregoing monomers represented by the general formulae (5), (6) and (7) respectively:

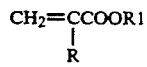  (5)

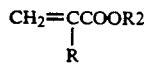  (6)

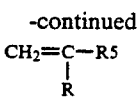  (7)

In these formulae, R represents a hydrogen atom or a methyl group; R1 represents a long chain alkyl group having 6 to 22 carbon atoms, a cyclic alkyl group having 6 to 22 carbon atoms or a group represented by the formula: $-(C_xH_{2x}O)_l-(C_xH_{2y}O)_m-R3$ (wherein R3 represents a hydrogen atom, an alkyl group or an aryl group); x and y each represents an integer ranging from 1 to 4; l and m each represents 0 or an integer of not less than 1, provided that the sum of l and m is an integer of not less than 2; R2 represents a (meth)acryloyl group-containing group; and R5 is a functional group having a molecular weight of less than 133 g.

In the foregoing general formula (6), R2 may be a (meth)acryloyl group-containing group represented by the following general formula (2):

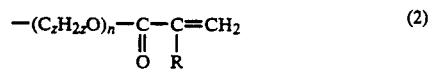  (2)

wherein R represents a hydrogen atom or a methyl group; z represents an integer ranging from 2 to 10; and n is an integer ranging from 1 to 4 when z is an integer ranging from 2 to 3, n is 1 or 2 when z is 4 or n is 1 when z is an integer ranging from 5 to 10.

The substituent R2 in the general formula (6) may also be a (meth)acryloyl group-containing group represented by the following general formula (3);

  (3)

wherein R represents a hydrogen atom or a methyl group; R4 represents an ester residue of a polyhydric alcohol having 1 to 12 carbon atoms; and a represents an integer ranging from 1 to 10.

Specific examples of the monomers represented by the general formula (5) and (6) are the same as those already defined above.

Examples of the monomers represented by the general formula (7) include styrene, vinyl monomers such as vinyl acetate, (meth)acrylic acid, methyl (meth)acrylate, ethyl (meth)acrylate, propyl (meth)acrylate, butyl (meth)acrylate, pentyl (meth)acrylate, hexyl acrylate, glycidyl (meth)acrylate, isocyanatoethyl (meth)acrylate and isomers thereof. These monomers represented by the general formula (7) may be used alone or in any combination of at least two of them.

The vinyl polymer having the repeating units represented by the general formula (1) (the first invention) can be prepared by adding 40 to 99.5 mole % of a monomer represented by the general formula (5) and 60 to 0.5 mole % of a monomer represented by the general formula (6) in a proper reactor and then radical-copolymerizing these monomers in a good solvent for the monomer represented by the general formula (5). In this respect, the total monomer concentration in the reaction system should be limited to not more than 2 mole/l in order to prevent the gelation thereof.

The vinyl polymer having the repeating units represented by the general formula (4) (the second invention) can be prepared by adding 40 to 99.5 mole % of a monomer represented by the general formula (5), 60 to 0.5 mole % of a monomer represented by the general formula (6) and 0 to 59.5 mole % of a monomer represented by the general formula (7) in a proper reactor and then radical-copolymerizing these monomers in a good solvent for the monomer represented by the general formula (5). In this respect, the total monomer concentration in the reaction system should be limited to not more than 2 mole/l in order to prevent the gelation thereof.

Examples of solvents used in the copolymerization are those having low polarity such as benzene, toluene, xylene, hexane, cyclohexane and heptane for the monomer whose substituent R1 is a long chain alkyl group having 6 to 22 carbon atoms or a cyclic alkyl group having 6 to 22 carbon atoms; or those having high polarity such as alcohols, for instance, methanol and ethanol, ketones, for instance, acetone and methyl ethyl ketone, esters, for instance, ethyl acetate and butyl acetate, ethers, for instance, dioxane and cellosolves, for instance, butyl cellosolve in addition to the foregoing solvents having low polarity for the monomers of the formula (5) whose substituent R1 is a group represented by the general formula: $-(C_xH_{2x}O)_l-(C_yH_{2y}O)_m-R3$.

In the foregoing copolymerization, commonly known radical polymerization initiators can be used and specific examples thereof include azo compounds such as 2,2'-azobisisobutyronitrile (hereinafter referred to as "AIBN"); and peroxy compounds such as lauroyl peroxide (hereinafter referred to as "LPO") and benzoyl peroxide (hereinafter referred to as "BPO") which may be used alone or in combination.

The reaction is carried out at a temperature which permits the practice of the radical-copolymerization, for instance, ranging from about 40° to 130° C.

In addition, a chain transfer agent selected from the group consisting of lauryl mercaptan and mercaptopropionic acid can optionally be used to control the degree of polymerization of the resulting polymers.

It is desirable to add a heat polymerization inhibitor selected from the group consisting of p-methoxyphenol, hydroquinone and butylhydroxytoluene to the reaction product for the purpose of imparting shelf stability to the resulting reaction product after the completion of the reaction.

The polymer produced is recovered by distilling off the reaction solvent under reduced pressure or by pouring the reaction solution in a precipitant to thus precipitate and purify the product.

In the preparation of the vinyl polymer whose repeating units are represented by the general formula (1) (the first invention), the monomers represented by the general formulae (5) and (6) are used in amounts ranging from 40 to 99.5 mole % and 60 to 0.5 mole % respectively. This is because, if the amount of the monomer (5) used is less than 40 mole %, the substituent R1 on the side chain of the monomer (5) does not show a sufficient steric effect and the resulting polymer becomes insoluble in the solvent in an early stage, in other words causes premature gelation. On the other hand, if it is more than 99.5 mole % or the amount of the monomer represented by the general formula (6) is less than 0.5 mole %, polymers can easily be produced, but the resulting polymer does not contain a sufficient amount of (meth)acryloyl side chains required for effective crosslinking thereof through the application of, for instance, heat or light rays and, therefore, the industrial value thereof is greatly impaired.

In the preparation of the vinyl polymer whose repeating units are represented by the general formula (4) (the second invention), the monomers represented by the general formulae (5), (6) and (7) are used in amounts ranging from 40 to 99.5 mole %, 60 to 0.5 mole % and 0 to 59.5 mole % respectively. This is because, if the amounts of the monomers represented by the general formulae (5) and (6) are beyond the ranges defined above, the same problems as those described above arise. If the amount of the monomer represented by the general formula (7) exceeds the upper limit, the substituent R1 on the side chain of the monomer (5) does not show a sufficient steric effect and the resulting polymer accordingly causes gelation.

The weight average molecular weight of the vinyl polymer according to the present invention in general ranges from $2 \times 10^3$ to $10^7$ and preferably $5 \times 10^3$ to $10^6$ g. This is because if it is less than $2 \times 10^3$ g, the number of the side chain: (meth)acryloyl group in the polymer is sometimes not more than 1 per polymer on the average since the resulting polymer has a small chain length. In other words, some of the resulting polymers do not contain any side chain: (meth)acryloyl group in the molecule. On the other hand, if it exceeds $10^7$ g, the melt viscosity of the resulting polymer is substantially increased and correspondingly the processability thereof is greatly impaired or further the compatibility thereof with other resins is lowered.

In this respect, the weight average molecular weight of the vinyl polymer was determined at 30° C. by means of Dynamic Light Scattering Photometer DLS 700 available from Otsuka Electric Co., Ltd. using tetrahydrofuran (THF) as a solvent.

The present invention will hereunder be explained in more detail with reference to the following non-limitative working Examples.

In the following Examples, $^1$H-NMR spectra were measured at 27° C. by means of an apparatus: GSX-400 available from NEC Corporation using CDCl$_3$ as a solvent. The content of the side chain: (meth)acryloyl group in the resulting polymer was determined on the basis of the $^1$H-NMR spectra of a sample solution containing a known amount of a reference substance.

Examples 1 to 11 and 18 to 21 relate to vinyl polymers whose repeating unit is represented by the general formula (1), while Examples 12 to 17 and 22 to 24 relate to vinyl polymers whose repeating unit is represented by the general formula (4).

EXAMPLE 1

There were mixed 120.8 g (0.475 mole) of lauryl methacrylate (Light Ester L; available from Kyoeisha Chemical Co., Ltd.), 8.3 g (0.025 mole) of tetraethylene glycol dimethacrylate (Light Ester 4 EG; available from Kyoeisha Chemical Co., Ltd.) and 3.3 g of AIBN and then benzene was added to obtain 1.9 l of a reaction solution. The resulting solution was charged in a 2 l volume 4-necked flask equipped with a stirring machine, a cooling tube, a thermometer and a tube for introducing nitrogen gas and radical copolymerization was performed at 50° C. for 10 hours in a nitrogen gas stream. After the completion of the copolymerization, the reaction solution was cooled, the reaction was interrupted by the addition of 200 ppm of p-methoxyphenol and then the solution was poured in methanol as a precipitating agent to thus deposit the resulting polymer. In order to purify or remove a trace amount of the unreacted monomers, the resulting polymer was again dissolved in benzene and then poured in methanol to again precipitate the polymer. The solvent was completely removed under reduced pressure to give 119 g of the final product (yield 92%). The polymer was analyzed by 400 MHz $^1$H-NMR spectroscopy and it was found out that peaks corresponding to the vinyl methylene proton =CH$_2$ of the side chain: methacryloyl group were detected at $\delta=5.7$ ppm and $\delta=6.2$ ppm in addition to the peak corresponding to lauryl methacrylate units as principal component. The weight average molecular weight of this polymer was found to be $6.5\times 10^5$ g.

EXAMPLE 2

The same procedures used in Example 1 were repeated except that 88.5 g (0.48 mole) of 2-ethylhexyl acrylate (Light Acrylate EH-A; available from Kyoeisha Chemical Co., Ltd.) and 4.0 g (0.02 mol) of ethylene glycol dimethacrylate (Light Ester EG; available from Kyoeisha Chemical Co., Ltd.) were substituted for the lauryl methacrylate and tetraethylene glycol dimethacrylate used in Example 1 respectively to give a purified polymer (84 g; yield 91%). The polymer thus obtained was analyzed by $^1$H-NMR spectroscopy and it was found out that peaks corresponding to the vinyl methylene proton =CH$_2$ of the side chain: methacryloyl group were detected at $\delta=5.7$ ppm and $\delta=6.2$ ppm. The weight average molecular weight of this polymer was found to be $3.8\times 10^5$ g.

EXAMPLE 3

The same procedures used in Example 1 were repeated except that 284.2 g (0.72 mole) of behenyl methacrylate and 8.5 g (0.03 mole) of 1,10-decanediol dimethacrylate were substituted for the lauryl methacrylate and tetraethylene glycol dimethacrylate used in Example 1 respectively to give a purified polymer (269 g; yield 92%). The polymer thus obtained was analyzed by $^1$H-NMR spectroscopy and it was found out that peaks corresponding to the vinyl methylene proton =CH$_2$ of the side chain: methacryloyl group were detected at $\delta=5.7$ ppm and $\delta=6.2$ ppm. The weight average molecular weight of this polymer was found to be $7.5\times 10^5$ g.

EXAMPLE 4

The same procedures used in Example 1 were repeated except that 80.9 g (0.475 mole) of n-hexyl methacrylate and 5.0 g (0.025 mole) of ethylene glycol dimethacrylate (Light Ester EG; available from Kyoeisha Chemical Co., Ltd.) were substituted for the lauryl methacrylate and tetraethylene glycol dimethacrylate used in Example 1 respectively to give a purified polymer (77 g; yield 90%). The polymer thus prepared was analyzed by $^1$H-NMR spectroscopy and it was found out that peaks corresponding to the vinyl methylene proton =CH$_2$ of the side chain: methacryloyl group were detected at $\delta=5.7$ ppm and $\delta=6.2$ ppm. The weight average molecular weight of this polymer was found to be $5.8\times 10^5$ g.

EXAMPLE 5

The same procedures used in Example 1 were repeated except that 82.7 g (0.475 mole) of methoxydiethylene glycol acrylate and 5.3 g (0.025 mole) of neopentyl glycol diacrylate were substituted for the lauryl methacrylate and tetraethylene glycol dimethacrylate used in Example 1 respectively, that dioxane was used as a solvent and that n-hexane was used as a solvent for reprecipitation to give a purified polymer (78 g; yield 89%). The polymer thus obtained was analyzed by $^1$H-NMR spectroscopy and it was found out that peaks corresponding to the vinyl methylene proton =CH$_2$ of the side chain: acryloyl group were detected at $\delta=5.9$ ppm and $\delta=6.5$ ppm and a peak for vinyl methine proton =CH— was detected at $\delta=6.2$ ppm. The weight average molecular weight of this polymer was found to be $6.2\times 10^5$ g.

EXAMPLE 6

The same procedures used in Example 1 were repeated except that 350.1 g (0.705 mole) of methoxynonaethylene glycol methacrylate and 11.4 g (0.045 mole) of 3-methyl-1,5-pentanediol dimethacrylate were substituted for the lauryl methacrylate and tetraethylene glycol dimethacrylate used in Example 1 respectively, that ethanol was used as a solvent and that n-hexane was used as a precipitating agent to give a purified polymer (325 g; yield 90%). The polymer thus obtained was analyzed by $^1$H-NMR spectroscopy and it was found out that peaks corresponding to the vinyl methylene proton =CH$_2$ of the side chain: methacryloyl group were detected at $\Delta=5.7$ ppm and $\delta-6.2$ ppm. The weight average molecular weight of this polymer was found to be $8.6\times 10^5$ g.

EXAMPLE 7

The same procedures used in Example 1 were repeated except that 306.3 g (0.287 mole) of p-nonylphenoxy octadecylethylene glycol acrylate and 18.9 g (0.063 mole) of tripropylene glycol diacrylate were substituted for the lauryl methacrylate and tetraethylene glycol dimethacrylate used in Example 1 respectively to give a purified polymer (236 g; yield 92%). The polymer thus obtained was analyzed by $^1$H-NMR spectroscopy and it was found out that peaks corresponding to the vinyl methylene proton =CH$_2$ of the side chain: acryloyl group were detected at $\delta=5.9$ ppm and $\delta=6.5$ ppm and a peak attributable to vinyl methine proton =CH— was detected at $\delta=6.2$ ppm. The weight average molecular weight of this polymer was found to be $2.4\times 10^5$ g.

EXAMPLE 8

The same procedures used in Example 1 were repeated except that 406.6 g (0.24 mole) of an ester of methacrylic acid with an alcohol having a molecular weight of about 1600 g and obtained by blocking, with a stearyl group, one end of an EO-PO random copolymer which comprised 11 moles of ethylene oxide and 15 moles of propylene oxide, and 23.2 g (0.06 mole) of tetrapropylene glycol dimethacrylate were substituted for the lauryl methacrylate and tetraethylene glycol dimethacrylate used in Example 1 respectively, that THF was used as a solvent and that n-hexane was used as a precipitating agent to give a purified polymer (391 g; yield 91%). The polymer thus obtained was analyzed by $^1$H-NMR spectroscopy and it was found out that peaks corresponding to the vinyl methylene proton =CH$_2$ of the side chain: methacryloyl group were lo detected at $\delta=5.7$ ppm and $\delta=6.2$ ppm. The weight average molecular weight of this polymer was found to be $4.8\times 10^5$ g.

EXAMPLE 9

The same procedures used in Example 1 were repeated except that 3.0 g (0.015 mole) of ethylene glycol dimethacrylate and 2.9 g (0.01 mole) of triethylene glycol dimethacrylate (Light Ester 3 EG; available from Kyoeisha Chemical Co., Ltd.) were substituted for the tetraethylene glycol dimethacrylate used in Example 1 to give a purified polymer (127 g; yield 91%). The polymer thus obtained was analyzed by $^1$H-NMR spectroscopy and it was found out that peaks corresponding to the vinyl methylene proton $=CH_2$ of the side chain: methacryloyl group were detected at $\delta=5.9$ ppm and $\delta=6.2$ ppm. The weight average molecular weight of this polymer was found to be $9.2\times10^5$ g.

EXAMPLE 10

The same procedures used in Example 1 were repeated except that 46.4 g (0.252 mole) of isooctyl acrylate (Light Acrylate IO-A; available from Kyoeisha Chemical Co., Ltd.) and 136.3 g (0.42 mole) of stearyl acrylate (Light Acrylate S-A; available from Kyoeisha Chemical Co., Ltd.) were substituted for the lauryl methacrylate used in Example 1 and 6.3 g (0.028 mole) of 1,6-hexanediol diacrylate (Light Acrylate 1,6 HX-A; available from Kyoeisha Chemical Co., Ltd.) was substituted for the tetraethylene glycol dimethacrylate used in Example 1 to give a purified polymer (166 g; yield 88%). The polymer thus obtained was analyzed by $^1$H-NMR spectroscopy and it was found out that peaks corresponding to the vinyl methylene proton $=CH_2$ of the side chain: acryloyl group were detected at $\delta=5.9$ ppm and $\delta=6.5$ ppm and a peak for vinyl methine proton $=CH-$ was detected at $\delta=6.2$ ppm. The weight average molecular weight of this polymer was found to be $7.1\times10^5$ g.

EXAMPLE 11

The same procedures used in Example 1 were repeated except that 105.5 g (0.475 mole) of isobornyl methacrylate (Light Ester IB-X; available from Kyoeisha Chemical Co., Ltd.) was substituted for the lauryl methacrylate used in Example 1 and 7.4 g (0.025 mole) of trimethylolpropane triacrylate (Light Acrylate TMP-A; available from Kyoeisha Chemical Co., Ltd.) was substituted for the tetraethylene glycol dimethacrylate used in Example 1 and that the reaction temperature was changed to 60° C. to give a purified polymer (99 g; yield 88%). The polymer thus prepared was analyzed by $^1$H-NMR spectroscopy and it was found out that peaks corresponding to the vinyl methylene proton $=CH_2$ of the side chain: acryloyl group were detected at $\delta=5.9$ ppm and $\delta=6.5$ ppm and a peak for vinyl methine proton $=CH-$ was detected at $\delta=6.2$ ppm. The weight average molecular weight of this polymer was found to be $4.2\times10^5$ g.

EXAMPLE 12

The same procedures used in Example 1 were repeated except that 50.9 g (0.2 mole) of lauryl methacrylate and 4.95 g (0.025 mole) of ethylene glycol dimethacrylate instead of the tetraethylene glycol dimethacrylate used in Example 1 as well as 28.6 g (0.275 mole) of styrene were used and that the reaction temperature was changed to 60° C. to give a purified polymer (80.2 g; yield 89%). The polymer thus obtained was analyzed by $^1$H-NMR spectroscopy and it was found out that peaks corresponding to the vinyl methylene proton $=CH_2$ of the side chain: methacryloyl group were detected at $\delta=5.7$ ppm and $\delta=6.2$ ppm. The weight average molecular weight of this polymer was found to be $4.5\times10^5$ g.

EXAMPLE 13

The same procedures used in Example 1 were repeated except that 101.8 g (0.4 mole) of lauryl methacrylate and 14.8 g (0.05 mole) of trimethylolpropane triacrylate instead of the tetraethylene glycol dimethacrylate used in Example 1 as well as 62.0 g (0.595 mole) of styrene were used, that 6.6 g of AIBN was used, that toluene was used as a solvent and that the reaction temperature was changed to 60° C. to give a purified polymer (163.0 g; yield 88%). The polymer thus obtained was analyzed by $^1$H-NMR spectroscopy and it was found out that peaks corresponding to the vinyl methylene proton $=CH_2$ of the side chain: acryloyl group were detected at $\delta=5.9$ ppm and $\delta=6.5$ ppm and a peak for vinyl methine proton $=CH-$ was detected at $\delta=6.2$ ppm. The weight average molecular weight of this polymer was found to be $5.0\times10^5$ g.

EXAMPLE 14

The same procedures used in Example 1 were repeated except that 57.2 g (0.225 mole) of lauryl methacrylate and 7.4 g (0.025 mole) of trimethylolpropane triacrylate instead of the tetraethylene glycol dimethacrylate used in Example 1 as well as 15.7 g (0.15 mole) of styrene and 10.0 g (0.1 mole) of methyl methacrylate were used and that the reaction temperature was changed to 60° C. to give a purified polymer (83.8 g: yield 89.5%). The polymer thus obtained was analyzed by $^1$H-NMR spectroscopy and it was found out that peaks corresponding to the vinyl methylene proton $=CH_2$ of the side chain: acryloyl group were detected at $\delta=5.9$ ppm and $\delta=6.5$ ppm and a peak for vinyl methine proton $=CH-$ was detected at $\delta=6.2$ ppm. The weight average molecular weight of this polymer was found to be $4.2\times10^5$ g.

EXAMPLE 15

The same procedures used in Example 1 were repeated except that 101.8 g (0.45 mole) of decyl methacrylate instead of the lauryl methacrylate used in Example 1 and 8.9 g (0.03 mole) of pentaerythritol triacrylate instead of the tetraethylene glycol dimethacrylate used in Example 1 as well as 67.7 g (0.52 mole) of 2-hydroxyethyl methacrylate were used, that 6.6 g of AIBN was used, that toluene was used as a solvent and that the reaction temperature was changed to 60° C. to give a purified polymer (167.4 g; yield 90.5%). The polymer thus obtained was analyzed by $^1$H-NMR spectroscopy and it was found out that peaks corresponding to the vinyl methylene proton $=CH_2$ of the side chain: acryloyl group were detected at $\delta=5.9$ ppm and $\delta=6.5$ ppm and a peak for vinyl methine proton $=CH-$ was detected at $\delta=6.2$ pPm. The weight average molecular weight of this polymer was found to be $2.9\times10^5$ g.

EXAMPLE 16

The same procedures used in Example 1 were repeated except that 89.0 g (0.35 mole) of lauryl methacrylate and 8.9 g (0.03 mole) of pentaerythritol triacrylate instead of the tetraethylene glycol dimethacrylate used in Example 1 as well as 14.2 g (0.1 mole) of glycidyl methacrylate and 3.6 g (0.035 mole) of styrene were used, 4.0 g of LPO was substituted for AIBN, toluene was used as a solvent and the reaction temperature was changed to 60° C. to give a purified polymer (109.2 g; yield 91.2%). The polymer thus obtained was analyzed by $^1$H-NMR spectroscopy and it was found out that peaks corresponding to the vinyl methylene proton $=CH_2$ of the side chain; acryloyl group were detected at $\delta=5.9$ ppm and $\delta=6.5$ ppm and a peak for vinyl methine proton $=CH-$ was detected at $\delta=6.2$ ppm. In addition, peaks attributable to epoxy groups were observed upon the infrared (IR) absorption spectroscopic measurement of the polymer. The weight average molecular weight of this polymer was found to be $5.5\times10^5$ g.

EXAMPLE 17

The same procedures used in Example 1 were repeated except that 165.4 g (0.65 mole) of lauryl methacrylate and 14.8 g (0.05 mole) of trimethylolpropane triacrylate instead of the tetraethylene glycol dimethacrylate used in Example 1 as well as 31.0 g (0.20 mole) of isocyanatoethyl methacrylate and 10.4 g (0.10 mole) of styrene were used, 4.0 g of LPO was substituted for AIBN, anhydrous toluene was used as a solvent and the reaction temperature was changed to 60° C. to give a purified polymer (199.9 g; yield 90.2%). The polymer thus obtained was analyzed by $^1$H-NMR spectroscopy and it was found out that peaks corresponding to the vinyl methylene proton $=CH_2$ of the side chain: acryloyl group were detected at $\delta=5.9$ ppm and $\delta=6.5$ ppm and a peak for vinyl methine proton $=CH-$ was detected at $\delta=6.2$ ppm. In addition, peaks attributable to NCO moieties were observed upon the infrared (IR) absorption spectroscopic measurement of the polymer. The weight average molecular weight of this polymer was found to be $3.2\times10^5$ g.

EXAMPLE 18

The same procedures used in Example 1 were repeated except that 90.3 g (0.49 mole) of 2-ethylhexyl acrylate (Light Acrylate EH-A; available from Kyoeisha Chemical Co., Ltd.) was substituted for the lauryl methacrylate used in Example 1 and that 3.4 g (0.01 mole) of trimethylolpropane trimethacrylate (Light Ester TMP; available from Kyoeisha Chemical Co., Ltd.) and 4.7 g (0.065 mole) of acrylic acid were substituted for the tetraethylene glycol dimethacrylate used in Example 1 to give a purified polymer (88 g; yield 89%). The polymer thus obtained was analyzed by $^1$H-NMR spectroscopy and it was found out that peaks corresponding to the vinyl methylene proton $=CH_2$ of the side chain: methacryloyl group were detected at $\delta=5.7$ ppm and $\delta=6.2$ ppm. The weight average molecular weight of this polymer was found to be $2.5\times10^5$ g.

EXAMPLE 19

The same procedures used in Example 1 were repeated except that 46.4 g (0.252 mole) of isooctyl acrylate (Light Acrylate IO-A; available from Kyoeisha Chemical Co., Ltd.) and 136.2 g (0.42 mole) of stearyl acrylate (Light Acrylate S-A; available from Kyoeisha Chemical Co., Ltd.) were substituted for the lauryl methacrylate used in Example 1 and that 6.3 g (0.028 mole) of 1,6-hexanediol diacrylate (Light Acrylate 1.6 HX-A; available from Kyoeisha Chemical Co., Ltd.) was substituted for the tetraethylene glycol dimethacrylate used in Example 1 to give a purified polymer (166 g; yield 88%). The polymer thus prepared was analyzed by $^1$H-NMR spectroscopy and it was found out that peaks corresponding to the vinyl methylene proton $=CH_2$ of the side chain: acryloyl group were detected at $\delta=5.9$ ppm and $\delta=6.5$ ppm and a peak for vinyl methine proton $=CH-$ was detected at $\delta=6.2$ ppm. The weight average molecular weight of this polymer was found to be $7.1\times10^5$ g.

EXAMPLE 20

The same procedures used in Example 1 were repeated except that 89.0 g (0.35 mole) of lauryl methacrylate and 7.4 g (0.025 mole) of trimethylolpropane triacrylate (Light Acrylate TMP-A; available from Kyoeisha Chemical Co., Ltd.) instead of the tetraethylene glycol dimethacrylate used in Example 1 as well as 27.8 g (0.125 mole) of isobornyl methacrylate (Light Ester IB-X; available from Kyoeisha Chemical Co., Ltd.) were used to give a purified polymer (116 g; yield 91%). The polymer thus prepared was analyzed by $^1$H-NMR spectroscopy and it was found out that peaks corresponding to the vinyl methylene proton $=CH_2$ of the side chain: acryloyl group were detected at $\delta=5.9$ ppm and $\delta=6.5$ ppm and a peak for vinyl methine proton $=CH-$ was detected at $\delta=6.2$ ppm. The weight average molecular weight of this polymer was found to be $9.8\times10^4$ g.

EXAMPLE 21

The same procedures used in Example 1 were repeated except that 105.5 g (0.475 mole) of isobornyl methacrylate (Light Ester IB-X; available from Kyoeisha Chemical Co., Ltd.) was substituted for the lauryl methacrylate used in Example 1, 7.4 g (0.025 mole) of trimethylolpropane triacrylate (Light Acrylate TMP-A; available from Kyoeisha Chemical Co., Ltd.) was substituted for the tetraethylene glycol dimethacrylate used in Example 1 and the reaction temperature was changed to 60° C. to give a purified polymer (99 g; yield 88%). The polymer thus obtained was analyzed by $^1$H-NMR spectroscopy and it was found out that peaks corresponding to the vinyl methylene proton $=CH_2$ of the side chain: acryloyl group were detected at $\delta=5.9$ ppm and $\delta=6.5$ ppm and a peak for vinyl methine proton $=CH-$ was detected at $\delta=6.2$ ppm. The weight average molecular weight of this polymer was found to be $4.2\times10^5$ g.

EXAMPLE 22

The same procedures used in Example 1 were repeated except that 50.9 g (0.2 mole) of lauryl methacrylate and 7.4 g (0.025 mole) of ethylene glycol diacrylate instead of the tetraethylene glycol dimethacrylate used in Example 1 as well as 28.6 g (0.275 mole) of styrene were used and the reaction temperature was changed to 60° C. to give a purified polymer (80.2 g; yield 89%). The polymer thus obtained was analyzed by $^1$H-NMR spectroscopy and it was found out that peaks corresponding to the vinyl methylene proton $=CH_2$ of the side chain: methacryloyl group were detected at $\delta=5.7$ ppm and $\delta=6.2$ ppm. The weight average molecular weight of this polymer was found to be $4.5\times10^5$ g.

EXAMPLE 23

The same procedures used in Example 1 were repeated except that 101.8 g (0.4 mole) of lauryl methacrylate and 14.8 g (0.05 mole) of trimethylolpropane triacrylate instead of the tetraethylene glycol dimethacrylate used in Example 1 as well as 62.0 g (0.595 mole) of styrene were used, 6.6 g of AIBN was used, toluene was used as a solvent and the reaction temperature was changed to 60° C. to give a purified polymer (163.0 g; yield 88%). The polymer thus obtained was analyzed by $^1$H-NMR spectroscopy and it was found out that peaks corresponding to the vinyl methylene proton $=CH_2$ of the side chain: acryloyl group were detected at $\delta=5.9$ ppm and $\delta=6.5$ ppm and a peak for vinyl methine proton $=CH-$ was detected at $\delta=6.2$ ppm. The weight average molecular weight of this polymer was found to be $5.0\times10^5$ g.

EXAMPLE 24

The same procedures used in Example 1 were repeated except that 165.4 g (0.65 mole) of lauryl methacrylate and 14.8 g (0.05 mole) of trimethylolpropane triacrylate instead of the tetraethylene glycol dimethacrylate used in Example 1 as well as 31.0 g (0.20 mole) isocyanatoethyl methacrylate and 10.4 g (0.10 mole) of styrene were used, 4.0 g of LPO was substituted for AIBN, toluene was used as a solvent and the reaction temperature was changed to 60° C. to give a purified polymer (199.9 g; yield 90.2%). The polymer thus obtained was analyzed by $^1$H-NMR spectroscopy and it was found out that peaks corresponding to the vinyl methylene proton $=CH_2$ of the side chain: acryloyl group were detected at $\delta=5.9$ ppm and $\delta=6.5$ ppm and a peak for vinyl methine proton $=CH-$ was detected at $\delta=6.2$ ppm. In addition, peaks attributable to NCO moieties were observed upon the infrared (IR) spectroscopic measurement of the polymer. The weight average molecular weight of this polymer was found to be $3.2\times10^5$ g.

REFERENCE EXAMPLE 1

The polymer obtained in Example 20 (100 parts by weight) and Darocure# 1173 (available from Merk Company) (3.0 parts by weight) were sufficiently mixed and the resulting mixture was applied onto a PET film which had been subjected to the corona discharge treatment with a bar coater so that the thickness of the resulting coated layer was equal to 10μ. The adhesive strength thereof to the PET film was 3.5 kg/25 mm. The resulting assembly was irradiated with light rays from a high pressure mercury lamp (80 W/cm) at a distance of 10 cm to harden the coated layer (conveyor velocity 6 m/min, 2 passes) and it was found that the adhesive strength of the adhesive irradiated with UV rays was 0.004 kg/25 mm. This clearly indicates that the polymer of Example 20 is suitable for use as a paste resin for adhesives peelable through UV irradiation. In this Reference Example, the adhesive strength was determined by cutting out a specimen having a size of 2.5 cm×10 cm from the PET film coated with the adhesive, adhering the specimen to a stainless steel plate at room temperature by moving a 2 kg roll thereon for two times, allowing to stand for one week and determining the adhesive strength at 25° C. by peeling the adhered film at an angle of 180° at a pulling rate of 300 mm/min.

COMPARATIVE EXAMPLE

The same procedures used in Example 1 were repeated except that 47.8 g (0.475 mole) of methyl methacrylate (Light Ester M; available from Kyoeisha Chemical Co., Ltd.) was substituted for the lauryl methacrylate used in Example 1 to perform synthesis, but the viscosity of the reaction system increased during the reaction and the system caused gelation.

What is claimed is:

1. A non-gelled vinyl polymer having (meth)acryloyl groups on the side chains, comprising repeating units represented by the following general formula (1):

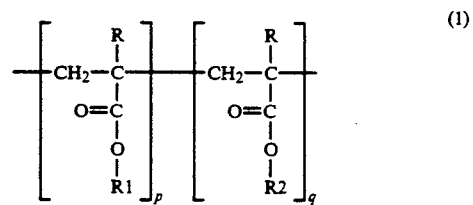

wherein R represents a hydrogen atom or a methyl group; R1 represents a long chain alkyl group having 6 to 22 carbon atoms, a cyclic alkyl group having 6 to 22 carbon atoms or a group represented by the following formula: $-(C_{2x}O)_l-(C_yH_{2y}O)_m-R3$ (wherein R3 represents a hydrogen atom, an alkyl group or an aryl group); x and y each represents an integer ranging from 1 to 4; l and m each represents 0 or an integer of not less than 1, provided that the sum of l and m is an integer of not less than 2; and R2 represents a (meth)acryloyl group-containing group, the rate of the subunit p ranging from 40 to 99.5 mole %, the rate of the subunit q ranging from 60 to 0.5 mole % and the vinyl polymer having a weight average molecular weight ranging from $2\times10^3$ to $10^7$ g.

2. The vinyl polymer having (meth)acryloyl groups on the side chains according to claim 1 wherein, in the general formula (1), R2 is a (meth)acryloyl group-containing group represented by the following general formula (2):

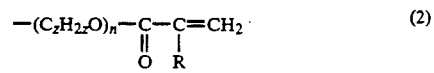

wherein R represents a hydrogen atom or a methyl group; z represents an integer ranging from 2 to 10; and n is an integer ranging from 1 to 4 when z is an integer ranging from 2 to 3, n is 1 or 2 when z is 4 or n is 1 when z is an integer ranging from 5 to 10.

3. The vinyl polymer having (meth)acryloyl groups on the side chains according to claim 1 wherein, in the general formula (1), the substituent R2 is a (meth)acryloyl group-containing group represented by the following general formula (3):

wherein R represents a hydrogen atom or a methyl group; R4 represents an ester residue of a polyhydric alcohol having 1 to 12 carbon atoms; and a represents an integer ranging from 1 to 10.

4. A non-gelled vinyl polymer carrying (meth) acryloyl groups on the side chains, comprising repeating units represented by the following general formula (4):

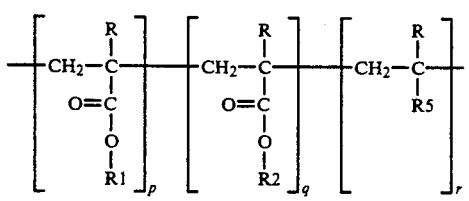

wherein R represents a hydrogen atom or a methyl group; R1 represents a long chain alkyl group having 6 to 22 carbon atoms, a cyclic alkyl group having 6 to 22 carbon atoms or a group represented by the formula: $-(C_xH_{2x}O)_l-(CH_yH_{2y}O)_m-R3$ (wherein R3 represents a hydrogen atom, an alkyl group or an aryl group); x and y each represents an integer ranging from 1 to 4; l and m each represents 0 or an integer of not less than 1, provided that the sum of l and m is an integer of not less than 2; R2 represents a (meth)acryloyl group-containing group; and R5 represents a functional group having a molecular weight of less than 133, the rate of the subunit p ranging from 40 to 99.5 mole %, the rate of the subunit q ranging from 60 to 0.5 mole %, the rate of the subunit r ranging up to 59.5 mole % and the vinyl polymer having a weight average molecular weight ranging from $2 \times 10^3$ to $10^7$ g.

5. The vinyl polymer having (meth)acryloyl groups on the side chains according to claim 4 wherein, in the general formula (4), the substituent R2 is a (meth)acryloyl group-containing group represented by the following general formula (2):

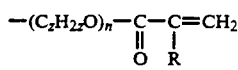

wherein R represents a hydrogen atom or a methyl group: z represents an integer ranging from 2 to 10; and n is an integer ranging from 1 to 4 when z is an integer ranging from 2 to 3, n is 1 or 2 when z is 4 or n is 1 when z is an integer ranging from 5 to 10.

6. The vinyl polymer having (meth)acryloyl groups on the side chains according to claim 4 wherein, in the general formula (4), the substituent R2 is a (meth)acryloyl group-containing group represented by the following general formula (3):

wherein R represents a hydrogen atom or a methyl group; R4 represents an ester residue of a polyhydric alcohol having 1 to 12 carbon atoms; and a represents an integer ranging from 1 to 10.

* * * * *